(12) United States Patent
Minor

(10) Patent No.: US 7,987,478 B2
(45) Date of Patent: Jul. 26, 2011

(54) METHODS, DEVICES, AND COMPUTER PROGRAM PRODUCTS FOR PROVIDING UNOBTRUSIVE VIDEO ADVERTISING CONTENT

(75) Inventor: Sten Hakan Minor, Lun (SE)

(73) Assignee: Sony Ericsson Mobile Communications AB

( * ) Notice: Subject to any disclaimer, the term of this patent is extended or adjusted under 35 U.S.C. 154(b) by 723 days.

(21) Appl. No.: 11/845,998

(22) Filed: Aug. 28, 2007

(65) Prior Publication Data

US 2009/0064219 A1    Mar. 5, 2009

(51) Int. Cl.
  *H04N 7/10* (2006.01)
  *H04N 5/445* (2006.01)
  *H04N 7/173* (2006.01)
(52) U.S. Cl. ............. 725/32; 725/36; 725/37; 725/42; 725/131
(58) Field of Classification Search .......... 725/32, 725/36–37, 42, 131
  See application file for complete search history.

(56) References Cited

U.S. PATENT DOCUMENTS

| | | | |
|---|---|---|---|
| 6,205,231 B1 | 3/2001 | Isadore-Barreca et al. | |
| 6,282,713 B1* | 8/2001 | Kitsukawa et al. | 725/36 |
| 6,944,228 B1 | 9/2005 | Dakss et al. | |
| 7,117,517 B1 | 10/2006 | Milazzo et al. | |
| 7,120,924 B1 | 10/2006 | Katcher et al. | |
| 7,577,978 B1* | 8/2009 | Wistendahl et al. | 725/113 |
| 2002/0059604 A1 | 5/2002 | Papagan et al. | |
| 2002/0184625 A1* | 12/2002 | Allport | 725/39 |
| 2003/0006911 A1* | 1/2003 | Smith et al. | 340/988 |
| 2003/0023972 A1* | 1/2003 | Gutta et al. | 725/34 |
| 2003/0115098 A1* | 6/2003 | Kang | 705/14 |
| 2005/0183111 A1* | 8/2005 | Cragun et al. | 725/22 |
| 2006/0179466 A1* | 8/2006 | Pearson et al. | 725/109 |
| 2006/0222322 A1* | 10/2006 | Levitan | 386/68 |
| 2007/0156739 A1* | 7/2007 | Black et al. | 707/102 |

FOREIGN PATENT DOCUMENTS

| | | |
|---|---|---|
| EP | 1443768 A1 | 8/2004 |
| WO | WO 01/72040 A2 | 9/2001 |
| WO | WO 01/93592 A1 | 12/2001 |

OTHER PUBLICATIONS

Notification of Transmittal of the International Search Report and The Written Opinion of the International Searching Authority, or The Declaration corresponding to International Application No. PCT/EP2008/051594 mailed May 20, 2008.
"Microsoft's New adLabs Develops Video Hyperlink Ads", http://www.marketingvox.com/archives/2006/01/13/microsofts_new_adlabs_develops_video_hyperlink_ads (2006).
"Microsoft adCenter Labs: Video Hyperlink", http://adlab.msn.com/VHL/.
"Microsoft's Interactive Video Advertising: Video Hyperlinks", http://pulse2.com/2007/03/19/microsofts-interactive-video-advertising-video-hyperlinks/ (2007).

* cited by examiner

*Primary Examiner* — Pankaj Kumar
*Assistant Examiner* — Franklin Andramuno
(74) *Attorney, Agent, or Firm* — Myers Bigel Sibley & Sajovec, P.A.

(57) ABSTRACT

A method of advertising during sequences of video images includes alerting a viewer of available video advertising content associated with an object displayed in a sequence of video images. A viewer selection of the object is received during the sequence of video images responsive to alerting the viewer, and an end of the sequence of video images is detected. The video advertising content is displayed responsive to receiving the viewer selection and after the end of the sequence of video images such that viewing of the sequence of video images is not interrupted. Related devices and computer program products are also discussed.

20 Claims, 4 Drawing Sheets

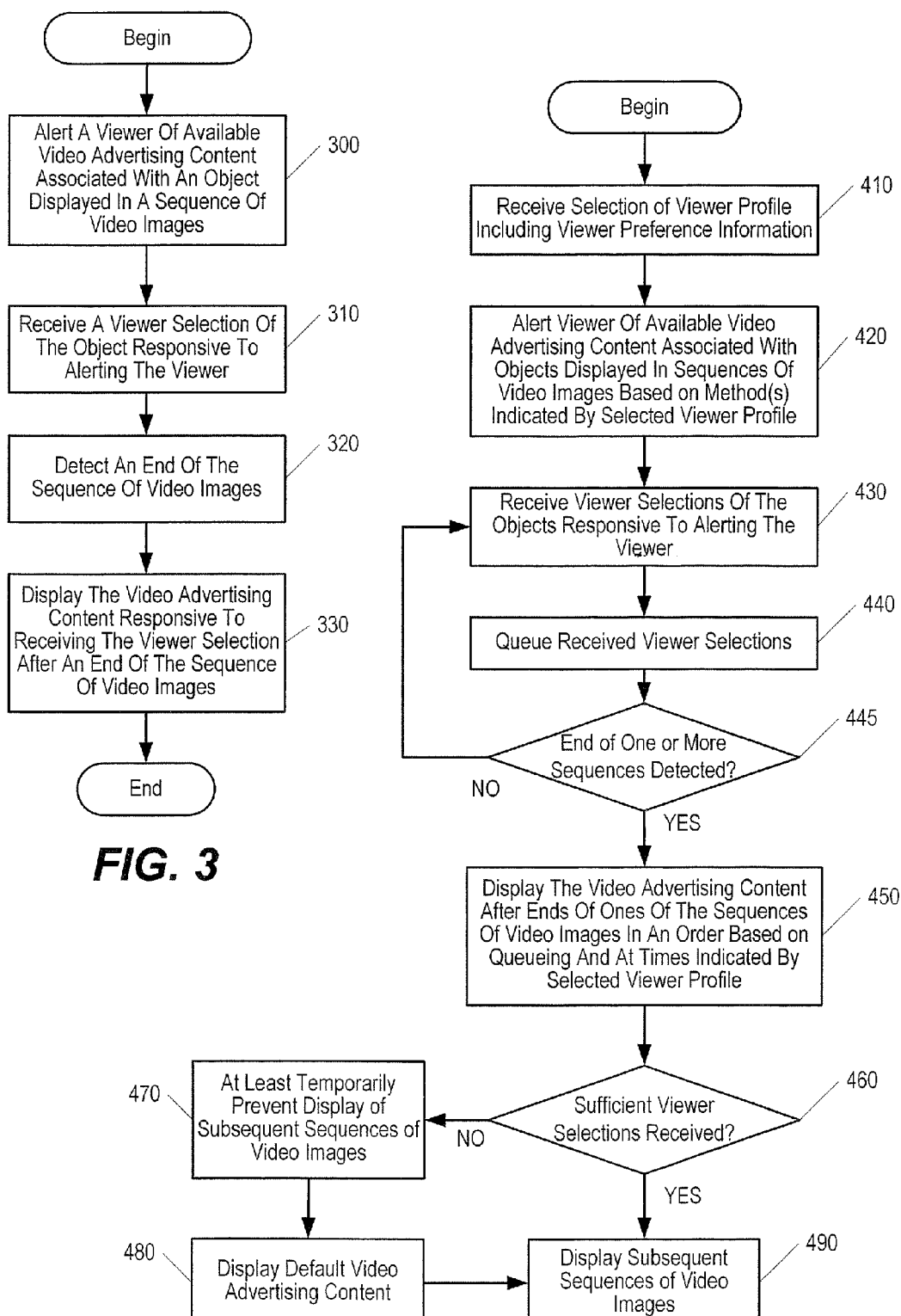

METHODS, DEVICES, AND COMPUTER PROGRAM PRODUCTS FOR PROVIDING UNOBTRUSIVE VIDEO ADVERTISING CONTENT

FIELD OF THE INVENTION

The present invention relates to advertising, and more particularly, to methods for providing video-based advertisements and related devices.

BACKGROUND OF THE INVENTION

Electronic devices, such as televisions, personal computers, and mobile terminals, increasingly provide access to a variety of communications, multimedia, and/or data processing capabilities. For example, mobile terminals, such as cellphones, personal digital assistants, and/or laptop computers, may provide storage and access to data in a wide variety of multimedia formats, including text, pictures, music, and/or video.

As such, advertising methods have been developed to provide advertising content in such multimedia formats. For example, Internet ads may "pop-up" as an Internet user navigates between webpages. However, much like television commercials during television programs, movies, and/or sporting events, such advertisements may typically be intrusive to a user, often interrupting the user multiple times during a session. Accordingly, some companies have developed more discreet advertising methods. For example, Microsoft's adCenter Labs has developed video hyperlink advertisements that can detect product items displayed on a television screen or monitor during a show or commercial, and may allow consumers to "click" on the items to access detailed product descriptions and/or information indicating where the items can be purchased. However, such video hyperlink advertisements may still be somewhat intrusive to the viewing experience.

SUMMARY OF THE INVENTION

According to some embodiments of the present invention, methods of advertising include alerting a viewer of available video advertising content associated with an object displayed in a sequence of video images, and receiving a viewer selection of the object responsive to alerting the viewer. An end of the sequence of video images is detected, and the video advertising content is displayed after the end of the sequence of video images responsive to receiving the viewer selection. For example, the end of the sequence of video images may be an end of a scene associated with a television show, an end of a period associated with a sporting event, and/or an end of a movie. As such, viewing of the sequence of video images is not interrupted.

In some embodiments, viewer preference information is received indicating a desired time for viewing the video advertising content, and a viewer profile including the viewer preference information is stored. The video advertising content is displayed after the end of the sequence of video images at the desired time indicated by the viewer profile.

In other embodiments, the viewer preference information may further indicate a desired viewer alert method, and the viewer may be alerted of the available video advertising content using the desired method indicated by the viewer profile. For example, the viewer may be alerted by providing a tactile notification of an on-screen presence of the object associated with the available video advertising content. In addition, the viewer may be alerted by displaying a textual and/or graphical notification of an on-screen presence of the object associated with the available video advertising content. For example, a textual and/or graphical icon may be displayed on a display of a remote control associated with the display of the sequence of video images. Also, the viewer may be alerted by providing an audible notification of an on-screen presence of the object associated with the video advertising content.

In some embodiments, the viewer may be alerted of a plurality of available video advertising content associated with a plurality of objects displayed in a plurality of sequences of video images. A plurality of viewer selections corresponding to ones of the plurality of objects may be received responsive to alerting the viewer. The plurality of received viewer selections may be queued, for example, based on an order of receipt thereof and/or based on priority data associated with the corresponding ones of the plurality of video advertising content. The ones of the plurality of video advertising content corresponding to the plurality of viewer selections may be displayed in an order based on the queuing thereof after ends of ones of the plurality of sequences. In addition, the display of subsequent sequences of video images may be at least temporarily impeded based on a number of received viewer selections.

In other embodiments, a current location of the viewer may be determined. As such, location-specific video advertising content may be displayed based on the current location of the viewer, for instance, by providing country and/or language-specific content. Also, the viewer may be alerted of the available video advertising content associated with the displayed object based on the current location of the viewer.

In some embodiments, historical data including previously received viewer selections may be stored. The viewer may be alerted of the available video advertising content associated with the displayed object based on the historical data.

According to other embodiments of the present invention, an electronic device includes a user interface and an advertising module. The user interface is configured to alert a viewer of available video advertising content associated with an object displayed in a sequence of video images, and is configured to receive a viewer selection of the object responsive to alerting the viewer. The advertising module is configured to detect an end of the sequence of video images, and is configured to provide the video advertising content to a display after the end of the sequence of video images responsive to receiving the viewer selection via the user interface such that viewing of the sequence of video images is not interrupted.

In some embodiments, the user interface may be further configured to receive viewer preference information indicating a desired time for viewing the video advertising content. The electronic device may further include a memory configured to store a viewer profile including the viewer preference information. The advertising module may be configured to provide the video advertising content to the display after the end of the sequence of video images at the desired time indicated by the viewer profile.

In other embodiments, the viewer preference information may further indicate a preferred viewer alert method. The advertising module may be configured to alert the viewer of the available video advertising content using the method indicated by the viewer profile.

In some embodiments, the advertising module may be configured to at least temporarily impede display of further sequences of video images based on a number of viewer selections received via the user interface.

In some embodiments, the device may further include a display configured to display the sequence of video images and the video advertising content after the end of the sequence of video images. For example, the device may be a mobile terminal.

Although described above primarily with respect to method and electronic device aspects of the present invention, it will be understood that the present invention may be embodied as methods, electronic devices, and/or computer program products.

BRIEF DESCRIPTION OF THE DRAWINGS

FIGS. 3-4 are flowcharts illustrating example operations for providing unobtrusive video advertising content in accordance with some embodiments of the present invention.

DETAILED DESCRIPTION OF EMBODIMENTS OF THE INVENTION

Figure 1A:
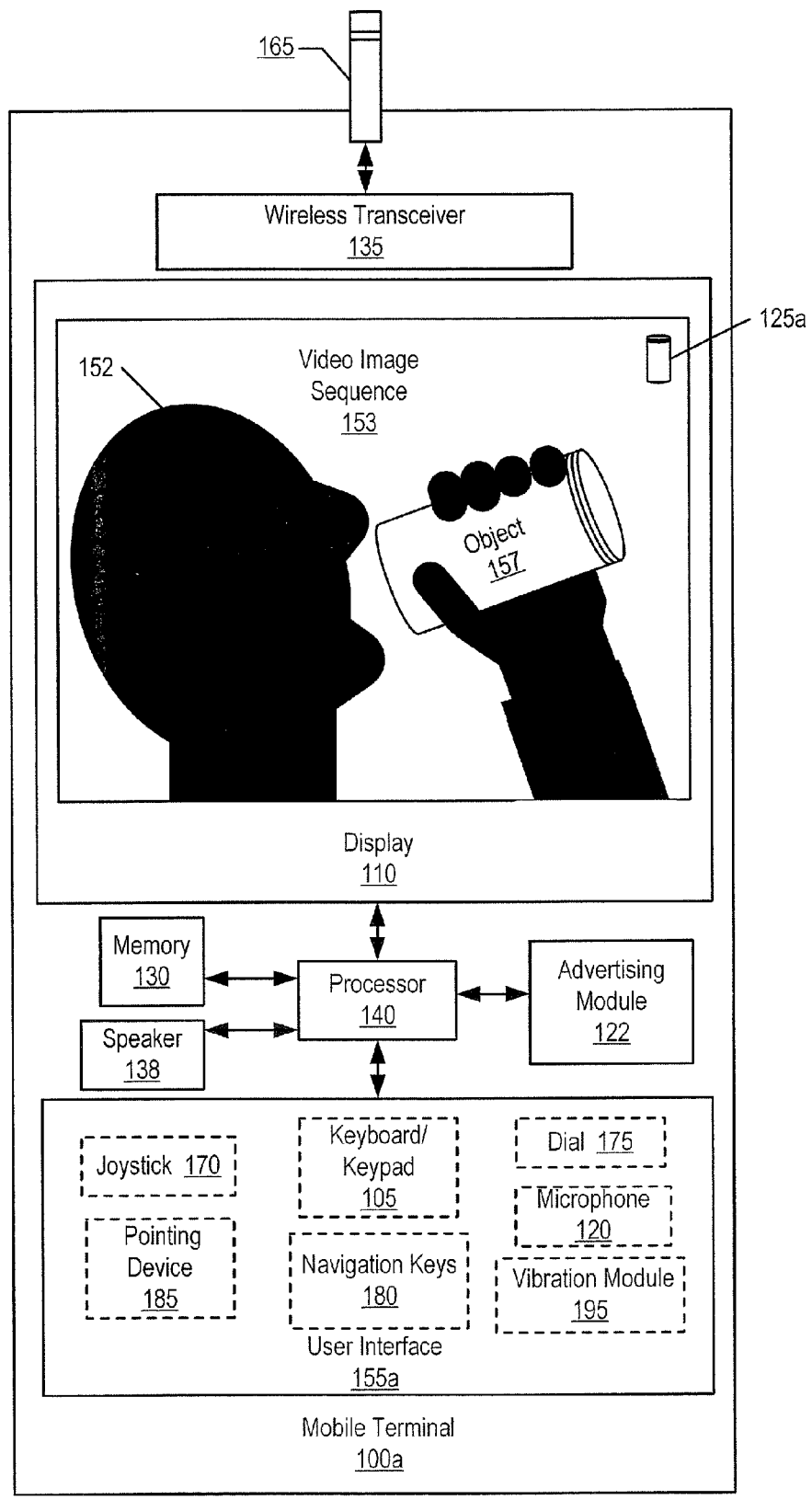
FIGS. 1A-1B are block diagrams illustrating electronic devices for providing unobtrusive video advertising content in accordance with some embodiments of the present invention.

The present invention now will be described more fully hereinafter with reference to the accompanying drawings, in which illustrated embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. In contrast, when an element is referred to as being "directly coupled" or "directly connected" to another element, there are no intervening elements present. Furthermore, "connected" or "coupled" as used herein may include wirelessly connected or coupled. As used herein, the term "and/or" includes any and all combinations of one or more of the associated listed items, and may be abbreviated as "/".

It will also be understood that, although the terms first, second, etc. may be used herein to describe various elements, these elements should not be limited by these terms. These terms are only used to distinguish one element from another. For example, a first electronic device could be termed a second electronic device, and, similarly, a second electronic device could be termed a first electronic device without departing from the teachings of the disclosure.

As will be appreciated by one of skill in the art, the present invention may be embodied as methods, devices, and/or computer program products. Accordingly, the present invention may be embodied in hardware and/or in software (including firmware, resident software, micro-code, etc.). Computer program code for carrying out operations of the present invention may be written in an object oriented programming language such as Java®, Smalltalk or C++, a conventional procedural programming languages, such as the "C" programming language, or lower-level code, such as assembly language and/or microcode. The program code may execute entirely on a single processor and/or across multiple processors, as a stand-alone software package or as part of another software package. The program code may execute entirely on an electronic device or only partly on the electronic device and partly on another device. In the latter scenario, the other device may be connected to the electronic device through a wired and/or wireless local area network (LAN) and/or wide area network (WAN), or the connection may be made to an external computer (for example, through the Internet using an Internet Service Provider).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

For purposes of illustration, some embodiments of the present invention are described herein in the context of a mobile terminal. As used herein, the term "mobile terminal" or "mobile electronic device" may include conventional cell phones, Personal Communications Systems (PCS)/smart phones that may include data processing, voice, video, text message, e-mail and/or Web access capabilities, Personal Digital Assistants (PDA) with wireless communications capabilities, wireless pagers, Blackberry wireless handheld e-mail devices, laptop computers, portable televisions, radios, and/or other portable electronic devices. It will be understood, however, that the present invention is not limited to such mobile electronic devices, and may be embodied generally as any electronic device that provides advertising functionality as described herein.

Some embodiments of the present invention may arise from realization that conventional methods of video advertising, including hyperlinked video advertisements, are somewhat intrusive to viewers, as the viewing experience may be interrupted by advertisements in the middle of a movie, television program, and/or sporting event being viewed. Accordingly, some embodiments of the present invention provide methods and devices for introducing unobtrusive video advertising content in television programs, music videos, sports broadcasts, movies, etc. More particularly, a link to the video advertising content may be included as an integral part of a sequence of video images based on objects displayed in the video images. For example, in a James Bond movie, Bond's car may be indicated as a link to a commercial for Aston Martin, while Bond's vodka martini may be indicated as a link to an advertisement for Absolut vodka. A viewer may be alerted to the presence of such objects in a discreet but noticeable manner, for example, by a visible on-screen icon, a short audible tone or sequence of tones, and/or a tactile vibration of a handheld device, such as a remote control and/or a mobile terminal. Responsive to receiving a viewer selection of an on-screen object, the video advertising content associated with the object may be displayed after the end of the sequence of video images. Accordingly, a viewer may receive additional information about a desired product without interruption of the movie, music video, TV program, and/or sporting event being viewed, as will be further discussed below with reference to FIGS. 1A-4.

Figure 1B:
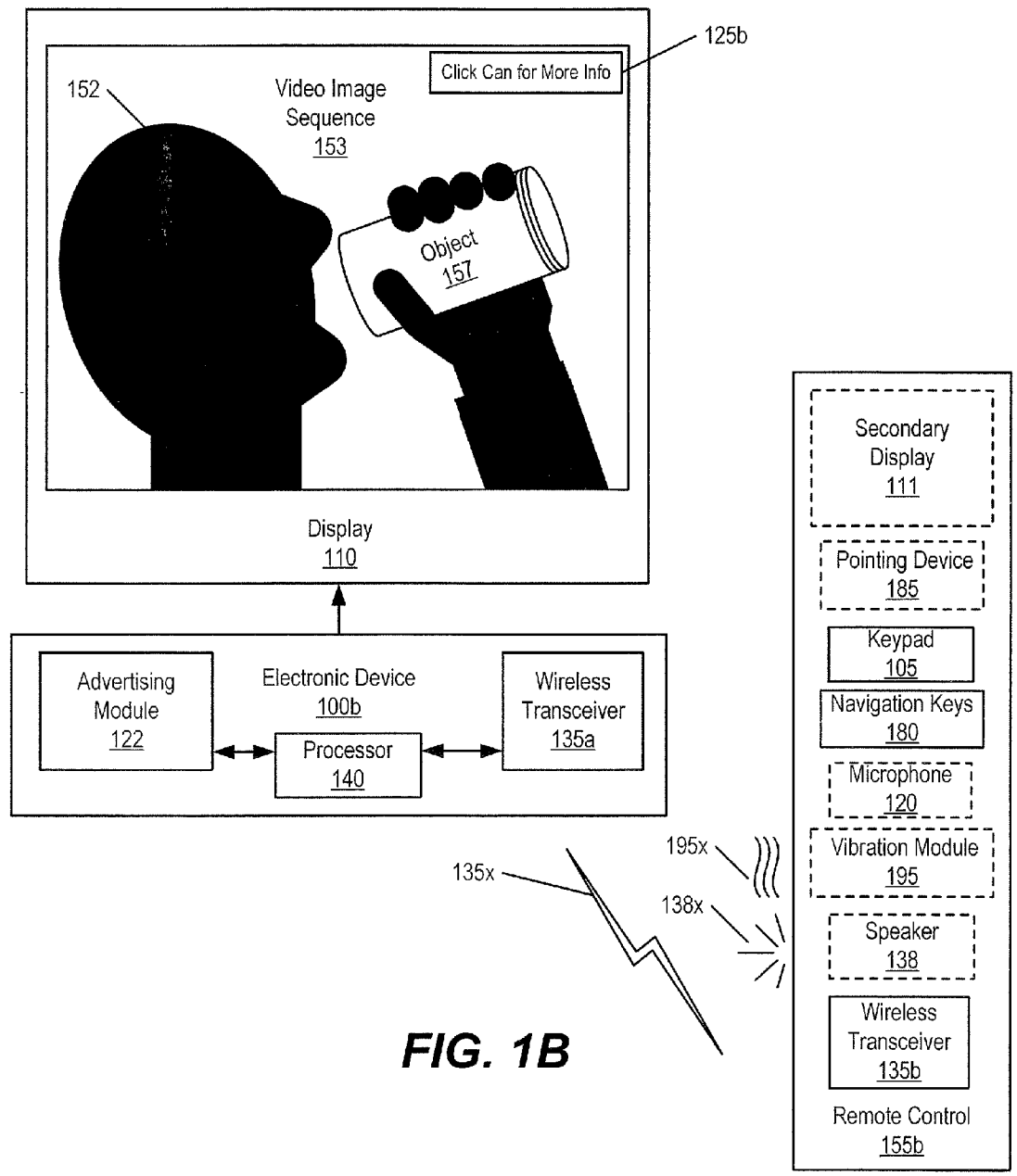

FIGS. 1A and 1B are block diagrams illustrating electronic devices configured to provide unobtrusive video advertising content in accordance with some embodiments of the present invention. Referring now to FIG. 1A, an exemplary electronic device, such as a mobile terminal 100a, includes a display 110 (such as a liquid crystal display), a processor 140, a memory 130, a speaker 138, and a user interface 155a. The processor 140 is coupled to the memory 130, the speaker 138, the display 110, and the user interface 155a. The processor 140 may be, for example, a commercially available or custom microprocessor that is configured to coordinate and manage operations of the memory 130, the speaker 138, the display 110, and/or the user interface 155a. The memory 130 may represent a hierarchy of memory that may include volatile and/or non-volatile memory, such as removable flash, magnetic, and/or optical rewritable non-volatile memory. The user interface 155a may include a microphone 120, a joystick 170, a keyboard/keypad 105, a dial 175, a navigation keys 180, a pointing device 185 (such as a mouse, trackball, touch pad, etc.), and/or an electric motor or other vibration module 195 configured to produce vibration in the mobile terminal 100a. However, depending on functionalities offered by the mobile terminal 100a, additional and/or fewer elements of the user interface 155a may actually be provided.

In some embodiments, the mobile terminal 100a may also include a wireless transceiver 135 configured to transmit and receive radio frequency signals to and from base station transceivers via an antenna 165. The radio frequency signals transmitted between the mobile terminal 100a and the base station transceivers may include both traffic and control signals (e.g., paging signals/messages for incoming calls), which are used to establish and maintain communication with another party or destination. The radio frequency signals may also include packet data information, such as, for example, cellular digital packet data (CDPD) information. In addition, the wireless transceiver 135 may include an infrared (IR) transceiver configured to transmit/receive infrared signals to/from other electronic devices via an IR port.

Still referring to FIG. 1A, the display 110 is configured to display one or more video image sequences 153. For example, the display 110 may be, for instance, a liquid crystal display (LCD) configured to display movies, television programs, televised sporting events, music videos, and the like. The video image sequence 153 may be received via the antenna 165 as part of a broadcast video signal and/or may be stored in the memory 130 of the mobile terminal 100a and/or on a removable storage medium, such as a memory card. The video image sequence 153 may be encoded such that one or more objects 157 displayed in a frame of the video image sequence 153 can be identified and tracked in subsequent frames. Some methods of identifying and tracking objects in video image sequences are described, for example, in U.S. Pat. No. 6,205,231, the disclosure of which is incorporated by reference herein. The object(s) 157 may be used as links to provide video advertising content for products and/or services associated with the objects 157 without interrupting viewing of the video image sequence 153.

More particularly, as shown in FIG. 1A, the mobile terminal 100a includes an advertising module 122 configured to identify an object 157 in a video image sequence 153 and alert a viewer of available video advertising content associated with the object 157 via the display 110 and/or the user interface 155a. For example, the advertising module 122 may be configured to provide an audible, visible, and/or tactile notification of an on-screen presence of the object 157 associated with the available video advertising content. More particularly, responsive to identification of the object 157 in the video image sequence 153, the advertising module 122 may be configured to display a graphical icon 125a on the display 110 indicating that the object 157 is associated with available video advertising content. For example, the object 157 may be a particular brand of beverage being consumed by an on-screen character 152, and the graphical icon 125a representing the brand of beverage may be provided in a corner of the display 110 so as not to significantly distract the viewer of the video image sequence 153. Additionally or alternatively, the advertising module 122 may be configured to provide an audible notification of the on-screen presence of the object 157 via the speaker 138, and/or a tactile notification via the vibration module 195. Thus, the presence of the object 157 associated with the available video advertising content in the displayed video image sequence 153 may be highlighted to a viewer in a discreet but noticeable manner.

Responsive to alerting the viewer of the presence of the available video advertising content, the user interface 155a may be configured to receive a viewer selection of the displayed object 157. For example, when the viewer is interested in additional information about the on-screen object 157, the viewer may use the keypad 105, the pointing device 185, and/or the navigation keys 180 to select or "click on" the displayed object 157 in response to seeing the graphical icon 125a indicating the available advertising content. In response to receiving the viewer selection via the user interface 155a, the advertising module 122 is configured to detect an end of the video image sequence 153 and provide video advertising content associated with the selected object to the display 110 after the end of the video image sequence 153. As such, viewing of the video image sequence 153 is not interrupted by the video advertising content. For example, the advertising module 122 may be configured to provide a commercial for a particular product and/or service associated with the object 157 to the display 110 after an end of the scene associated with a television show, after an end of a period associated with a sporting event, and/or after an end of a movie or feature film. In other words, the advertising module 122 may be configured to present the video advertising content associated with the selected object 157 via the display 110 after a predetermined programming break in one or more of the video image sequences 153. The video advertising content may be downloaded to the mobile terminal 100a over a wired and/or wireless network (for instance, via the wireless transceiver 135), and/or may be stored in the memory 130 (and/or a removable storage medium) along with the video image sequence 153. Thus, the video advertising content may be provided to a viewer without interrupting the viewing of the video image sequence 153.

FIG. 1B illustrates a configuration where the display, the user interface, and the electronic device are provided as separate components in accordance with some embodiments of the present invention. Referring now to FIG. 1B, an exemplary electronic device 100b includes an advertising module 122, a processor 140, and a wireless transceiver 135a. For example, the electronic device 100b may be a cable box, a digital versatile disc (DVD) player, and/or a digital video recorder (DVR) that is configured to be connected to the display 110. The user interface for the electronic device 100b may be provided in the form of a remote control 155. The remote control 155b may include a secondary display 111, a pointing device 185, a keypad 105, navigation keys 180, a microphone 120, a vibration module 195, a speaker 138, and a wireless transceiver 135b. The wireless transceiver 135b may be configured to communicate with the wireless transceiver 135a to provide viewer inputs entered via the remote control 155b to the electronic device 100b. For example, the wireless transceivers 135a and 135b may include infrared (IR) transceivers configured to transmit/receive infrared signals therebetween via an IR port. The display 110 may be, for example, a television, a monitor, a projector, and/or other device configured to display sequences of video images.

As shown in FIG. 1B, the display 110 is configured to display a video image sequence 153 including at least one object 157 that is associated with available video advertising content. The video image sequence 153 may be a portion of a video signal received, for example, via a cable and/or antenna broadcast. In addition, the video image sequence 153 may be encoded on a removable storage medium, such as a DVD, that is configured to be played back via the electronic device 100b. The advertising module 122 of the electronic device 100b is configured to identify the object 157 in the video image sequence 153 and alert the viewer of the available video advertising content associated with the object 157 via the display 110 and/or the remote control 155b. For example, the advertising module 122 may be configured to alert the viewer of the available advertising content by displaying text-based instructions 125b indicating how to access the video advertising content associated with the on-screen object 157.

More particularly, FIG. 1B illustrates that the on-screen object 157 is a particular brand of beverage. As such, the advertising module 122 provides the text-based instructions "Click Can For More Info" 125b via the display 110 to alert the viewer of the available advertising content associated with the on-screen beverage 157. Although the text-based instructions 125b are illustrated as provided in a corner of the display 110, it should be noted that the electronic device 100b may be configured to provide the text-based instructions 125b and/or a graphical notification (such as the graphical icon 125a of FIG. 1A) of the presence of the object 157 in the video image sequence 153 via the secondary display 111 of the remote control 155b by transmitting an alert signal 135x via the wireless transceiver 135a. In addition, the advertising module 122 may be configured to provide an audible notification 138x of the presence of the displayed object 157 via the speaker 138 of the remote control 155b. Furthermore, the advertising module 122 may be configured to provide a tactile notification 195x of the presence of the displayed object 157 via the vibration module 195, causing the remote control 155 to vibrate. As such, responsive to alerting the viewer of the available video advertising content associated with the on-screen object 157, the electronic device 100b may receive a viewer selection of the object 157 via the pointing device 185, keypad 105, and/or navigation keys 180 of the remote control 155b, and may provide the corresponding video advertising content to the display 110 after an end of the video image sequence 153, as discussed above. Accordingly, the video advertising content may be provided without interruption of the video image sequence 153. In addition, in some embodiments, a listing of products and/or services associated with one or more of the objects 157 displayed in the video image sequences 153 may also be provided via the display 110 as a viewer notification after the end of one or more video image sequences, and may be selected via the remote control 155b and/or other user interface to access the corresponding video advertising content.

Although FIGS. 1A and 1B illustrate exemplary electronic devices configured to provide unobtrusive video advertising content according to some embodiments of the present invention, it will be understood that the present invention is not limited to such configurations but is intended to encompass any configuration capable of carrying out operations described herein. For example, while the advertising module 122 and the processor 140 are illustrated as separate components, it is to be understood that the processor 140 may include functionality of the advertising module 122 in some embodiments. In addition, although illustrated in FIG. 1B as an electronic device 100b with a remote control 155b, the electronic device 100b may be a personal computer accessed using a mouse and/or keyboard rather than the remote control 155b. More generally, although illustrated with reference to specific blocks having specific functions, it is to be understood that the functionality of these blocks may be combined, divided, and/or eliminated.

Figure 2:
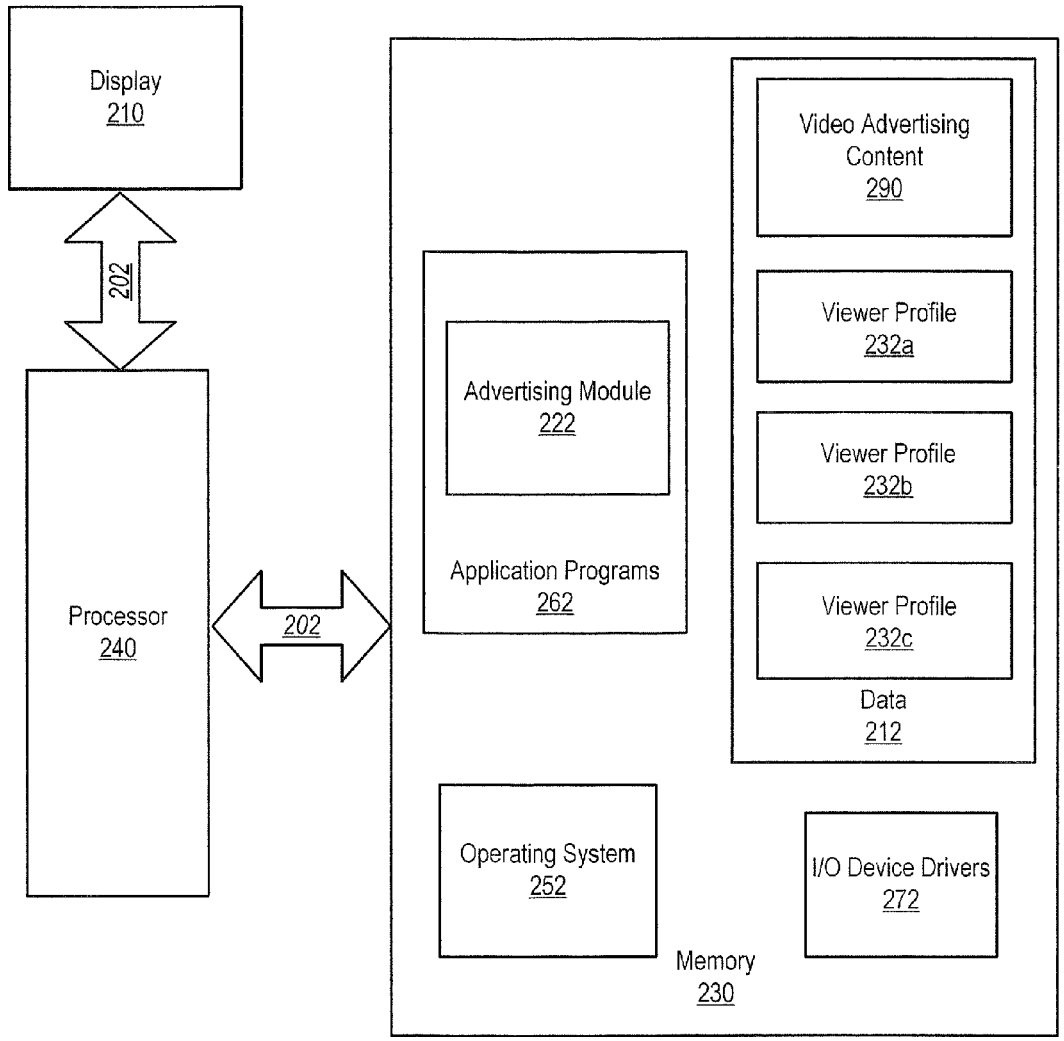
FIG. 2 is a block diagram illustrating a hardware/software architecture for providing unobtrusive video advertising content in accordance with some embodiments of the present invention.

FIG. 2 illustrates a hardware/software architecture including a display 210, a memory device 230, and a processor 240 that may be used to provide unobtrusive video advertising content according to some embodiments of the present invention. In some embodiments, the processor 240, memory 230, and display 210 may respectively correspond to the processor 140, memory 130, and display 110 of the mobile terminal 100a and/or electronic device 100b of FIGS. 1A and/or 1B.

Referring now to FIG. 2, the processor 240 is configured to communicate with the memory 230 and the display 210 via data buses 202. The display 210 may be configured to display data that is provided via the processor 240. The memory 230 may be configured to store several categories of software, such as an operating system 252, applications programs 262, and input/output (I/O) device drivers 272. The operating system 252 controls the management and/or operation of system resources and may coordinate execution of programs by the processor 240. The I/O device drivers 272 typically include software routines accessed through the operating system 252 by the application programs 262 to communicate with input/output devices, such as those included in the user interface 155a of FIG. 1A and/or the remote control 155b of FIG. 1B, and/or other components of the memory 230. The memory 230 further includes data 212 for the application programs 262, such as one or more viewer profiles 232a-232c and/or available video advertising content 290. The video advertising content 290 may be received and/or downloaded and stored in the memory 230, for example, during reception of a television broadcast. However, it is to be understood that, in some embodiments, the video advertising content 290 may not be stored in the memory 230. For instance, the video advertising content 290 may be stored on a fixed and/or removable storage medium along with the sequence of video images to be displayed, such as on a DVD along with a movie.

The application programs 262 are illustrative of programs that implement various features according to embodiments of the present invention, and preferably include at least one application which supports operations for providing video advertising content at an end of a sequence of video images responsive to a prior viewer selection. More particularly, the application programs 262 includes an advertising module 222 configured to alert a viewer of available video advertising content associated with an object displayed in a sequence of video images shown on the display 210. Responsive to receiving a viewer selection of the displayed object via the I/O device drivers 272, the advertising module 222 is configured to determine an end of the displayed sequence of video images and provide the video advertising content 290 corresponding to the received viewer selection to the display 210 at some point after an end of the sequence of video images, such that viewing of the sequence of video images is not interrupted. For example, the advertising module 222 may be configured to provide the video advertising content 290 to the display 210 after an end of a scene of a television show, an end of a period of a sporting event (e.g., halftime), and/or an end of a movie/feature film show on the display 210.

In some embodiments, the advertising module 222 may be configured to alert the viewer of the available video advertising content and/or provide the video advertising content to the display 210 based on viewer preferences. More particularly, viewer preference information may be received via a user interface, such as the user interface 155a of FIG. 11A, and may be stored in the memory 230 as one or more viewer profiles 232a-232c. Accordingly, the viewer profiles 232a-232c may indicate preferred methods of alerting the viewer when video advertising content 290 associated with one or more on-screen objects is available, desired times for displaying the video advertising content, and/or a historical data and of previously selected objects displayed in sequences of video images. A viewer of the display 210 may thereby select one of the stored viewer profiles 232a-232c, and the advertising module 222 may be configured to alert the viewer of available video advertising content in a preferred manner and/or provide the video advertising content 290 at a desired time based on the selected one of the stored viewer profiles 232a-232c.

For example, a selected viewer profile 232a may include viewer preference information indicating that the viewer would prefer a tactile notification when video advertising content 290 associated with an object displayed on the display 210 is available. As such, when a sequence of video images including an object associated with available video advertising content 290 is received for playback via the display 210, the processor 240 may provide the sequence of video images to the display 210, while the advertising module 222 may identify the object in the video image sequence and generate an alert signal to activate a vibration module in a user interface associated with the display 210 via the I/O device drivers 272. For instance, responsive to identifying the on-screen object 157 in the video image sequence 153 of FIG. 1B, the advertising module 222 may transmit the alert signal 135x to the vibration module 195 of the remote control 155b, thereby causing vibration 195x of the remote control 155b.

Also, the viewer preference information stored in a selected viewer profile 232b may indicate that the viewer prefers both audible and visible notifications of available video advertising content to be provided via a remote control (such as the remote control 155b of FIG. 1B) and/or other user interface, rather than via the display 210. As such, the advertising module 222 may be configured to provide the audible and visible notifications when an object associated with the available video advertising content 290 is shown on the display 210 by generating and transmitting alert signals to a speaker and a display in the remote control, such as the speaker 138 and the secondary display 111 of FIG. 1B.

In addition, the viewer preference information stored in a selected viewer profile 232c may include historical data indicating previously received the viewer selections, and the advertising module 222 may be configured to alert the viewer of particular available video advertising content based on the previously received viewer selections. For example, the previously received viewer selections stored in viewer profile 232c may indicate that the viewer is interested in German automobiles. As such, when a video image sequence depicting a car chase a car chase between a Renault, a Volvo, and a BMW is shown on the display 210, the advertising module 222 may be configured to identify the Renault, the Volvo, and the BMW as objects associated with available video advertising content, but may only alert the viewer of the available advertising content associated with the BMW. For example, the advertising module 222 may transmit instructions via the processor 240 to display the textual notification "Click On BMW For More Details" on the display 210. Likewise, when a selected viewer profile 232b includes historical data indicating that the viewer has predominantly selected objects relating to sports products and/or services in the past, the advertising module 222 may be configured to alert the viewer of the presence of more sports-related objects shown in a video image sequence than other types of objects. Thus, the history of the objects that a viewer has previously selected may be used by the advertising module 222 to determine when to alert the viewer in cases where a video image sequence that includes a plurality of objects associated with the available video advertising content 290 is shown on the display 210.

Also, the advertising module 222 may be configured to determine a current location of the viewer and/or the display 210, and may be configured to provide location-specific video advertising content to the display 210 based on the determined location. For example, in a mobile terminal, such as the mobile terminal 100a of FIG. 1A, the advertising module 222 may be configured to determine the current location based on an IP address, cell identification, and/or other network identifier. In addition, the advertising module 222 may be configured to determine the current location based on a GPS transceiver (not shown) included in the electronic device. The advertising module 222 may thereby be configured to adapt the video advertising content based on the determined location, for instance, to provide country and/or language specific content. For example, when the advertising module 222 determines that the display 210 is located in France, the advertising module 222 may provide French-language video advertising content to the display 210 after the end of a sequence of video images responsive to receiving a corresponding viewer selection. In addition, the advertising module 222 may be configured to alert the viewer of particular video advertising content based on the determined location, such as when a displayed object is available for purchase in the viewer's geographic area. For instance, when a character in a sequence of video images is driving a Renault, the advertising module 222 may be configured to identify the Renault as an object associated with available video content, but may only alert the viewer of available advertising content associated with the displayed Renault when the determined location of the display 210 indicates that the viewer is located in a country and/or region where Renaults are sold. Also, in some embodiments, the current location of the viewer and/or display 210 may be stored in one or more of the viewer profiles 232a-232c.

The advertising module 222 may further be configured to identify a plurality of objects associated with the available video advertising content 290 in a video image sequence shown on the display 210, and may thereby provide multiple notifications to the viewer. For example, when an on-screen character is depicted drinking a particular brand of beverage while driving a particular brand of automobile, the advertising module 222 may be configured to provide graphical "car" and "beverage" icons at a corner of the display 210 via the processor 240. Alternatively or additionally, the advertising module 222 may be configured to provide textual, audible, and/or tactile notifications of the available advertising content 290 associated with multiple on-screen objects, as discussed above. For example, the advertising module may be configured to provide short audio sequences associated with the automobile (e.g., an engine revving) and the beverage (e.g., a gulping sound) via a speaker associated with the display and/or the user interface to alert the viewer of the available video advertising content 290 associated with each.

In response to alerting the viewer, the advertising module 222 may receive a plurality of viewer selections via the user interface corresponding to ones of the plurality of displayed objects. The advertising module 222 may queue the received viewer selections and provide the corresponding ones of the video advertising content 290 to the display 210 via the processor 240 after the end of the video image sequence in an order based on the queue. For example, the advertising module 222 may queue the received viewer selections based on an order of receipt of each viewer selection. In addition, the advertising module 222 may queue the received viewer selections in an order that is based on priority data associated with the corresponding video advertising content 290. For instance, some advertisers may provide greater compensation in exchange for display of their video advertising content at a higher priority than other video advertising content when objects corresponding to both are selected by a viewer. As such, the video advertising content 290 may include priority data based on the amount of compensation provided by the corresponding advertisers, and the advertising module 222 may be configured to queue the received viewer selections corresponding to video advertising content including such priority data before his viewer selections corresponding to advertising content with lower and/or no associated priority data. Additionally or alternatively, the viewer profiles 232a-232c may include information that indicates a desired priority for advertisements associated with particular products based on viewer preferences, and the advertising module 222 may be configured to queue the received viewer selections and provide the video advertising content to the display 222 based on the priority information stored in a selected one of the viewer profiles 232a-232c.

The advertising module 222 may be configured to provide the video advertising content 290 corresponding to the received viewer selections after the end of a currently displayed sequence of video images, and/or after the end of several video image sequences. For instance, the advertising module 222 may provide some video advertising content immediately after a current period of a sporting event shown on the display 210, and may provide other video advertising content after the end of all periods of the sporting event (e.g., after the game), for example, depending on the priority information associated with the video advertising content and/or the viewer preferences indicated by a selected one of the viewer profiles 232a-232c.

Also, in some embodiments, the advertising module 222 may be configured to impede or prevent display of further or subsequent video image sequences based on a number of received viewer selections, for instance, when the number of received viewer selections is less than a predetermined minimum. For example, a television program provider may desire a minimum number of television commercials to be displayed prior to the end of a particular television program, and the advertising module 222 may be configured to at least temporarily prevent the display of one or more subsequent sequences of video images associated with the television program until the number of received viewer selections corresponds to the minimum number of television commercials. In addition, the advertising module 222 may be configured to automatically display one or more default commercials when the number of received viewer selections is less than the desired minimum number, for example, to comply with contractual obligations with the corresponding advertisers.

Although FIG. 2 illustrates an exemplary hardware/software architecture that may be used in mobile terminals and/or other electronic devices for providing unobtrusive video advertising content, it will be understood that the present invention is not limited to such a configuration but is intended to encompass any configuration capable of carrying out operations described herein. For example, although the memory 230 is illustrated as separate from the processor 240, the memory 230 or portions thereof may be considered as a part of the processor 240. More generally, while particular functionalities are shown in particular blocks by way of illustration, functionalities of different blocks and/or portions thereof may be combined, divided, and/or eliminated. Moreover, the functionality of the hardware/software architecture of FIG. 2 may be implemented as a single processor system or a multi-processor system in accordance with various embodiments of the present invention.

Computer program code for carrying out operations of devices and/or systems discussed above with respect to FIGS. 1A-2 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, mobile terminals, electronic devices, data processing systems, and/or computer program products in accordance with some embodiments of the invention.

These flowchart and/or block diagrams further illustrate exemplary operations for providing unobtrusive video advertising content in accordance with various embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

FIG. 3 is a flowchart that illustrates exemplary operations for providing unobtrusive video advertising content in accordance with some embodiments of the present invention. Referring now to FIG. 3, a viewer is alerted of available video advertising content associated with one or more objects displayed in a sequence of video images (block 300). For example, one or more objects representing products and/or services associated with available television commercials may be displayed during a television program, and an audible, visible, and/or tactile notification may be provided to indicate the on-screen presence of such objects to the viewer. The notification of available video advertising content may be provided via the display itself by an on-screen graphical and/or textual icon, and/or via a user interface associated with the display, such as a mouse, keyboard, and/or remote control. A viewer selection of at least one of the objects is received responsive to alerting the viewer (block 310). For instance, in a mobile phone, navigation keys may be used to move an on-screen cursor to select one or more displayed objects responsive to the display of the corresponding graphical icons indicating the presence of available video advertising content associated with the on-screen objects. In addition, in a DVD player, the navigation keys and/or other pointing device on a corresponding remote control may be used to move the on-screen cursor to select one or more of the on-screen objects.

Still referring to FIG. 3, responsive to receiving the viewer selection(s), an end of the sequence of video images is detected (block 320), and the video advertising content associated with the selected object(s) is displayed after the end of the sequence of video images (block 330). The end of the video image sequence may be, for example, an end of a scene in a television program, an end of a period in a sporting event, an end of a feature film, and/or other predetermined end time, such as a scheduled commercial break. The time of display of the video advertising content may also be determined based on viewer preference information, for example, as stored in a viewer profile that may be selected by a viewer of the display. Accordingly, the video advertising content may be displayed after the end of a sequence of video images in a relatively unobtrusive manner such that viewing of the sequence of video images is not interrupted.

FIG. 4 is a flowchart illustrating example operations for providing unobtrusive video advertising content in accordance with further embodiments of the present invention. Referring now to FIG. 4, a selection of a viewer profile including viewer preference information associated with viewing video advertising content during video image sequences (such as movies, television programs, televised sporting events, etc.) is received (block 410). The viewer preference information may indicate, for example, preferred times for display of the video advertising content, preferred methods of alerting the viewer of the presence of on-screen objects associated with available video advertising content, the viewer's current location, and or historical data regarding previously selected video advertising content.

When one or more objects associated with available video advertising content are displayed in a sequence of video images, the viewer is alerted of the available video advertising content based on the method(s) indicated by the selected viewer profile (block 420). For example, where the selected viewer profile indicates that the viewer prefers a tactile notification, the viewer may be alerted of the available video advertising content associated with the on-screen objects by transmitting a signal to an electric motor included in a remote control, mobile terminal, and/or other user interface associated with the display to cause vibration of the user interface. Additionally or alternatively, where the selected viewer profile indicates that the viewer prefers both audible and visible notifications, the viewer may be alerted of the available video advertising content by transmitting a signal to display a graphical icon in a corner of the display and to provide an audible tone and/or sequence of tones via a speaker associated with the display. The viewer may also be alerted of multiple on-screen objects associated with available video advertising content, for example, by displaying multiple graphical icons. For instance, in a sequence of video images where an on-screen character is eating breakfast in a kitchen, a "cereal box" icon and a "refrigerator" icon may be displayed to alert the viewer of available video advertising content associated with the particular brand of cereal and brand of refrigerator used by the on-screen character.

Still referring to FIG. 4, one or more viewer selections of the displayed objects associated with the available video advertising content are received (block 430) and queued (block 440) responsive to alerting the viewer. For instance, navigation keys and/or a pointing device provided by the user interface associated with the display may be used to move an on-screen cursor to select one or more on-screen objects. The received viewer selections may be queued, for example, in an order that is based on the order of receipt of the viewer selections. In addition, the viewer selections may be queued in an order that is based on priority data associated with the corresponding video advertising content. For example, as some advertisers may provide greater compensation to television, movie, and or sports content providers, at least some of the available video advertising content may include priority data indicating that such advertising content should be displayed with higher levels priority responsive to receiving viewer selections corresponding to such content. Additionally or alternatively, the selected viewer profile may indicate that the viewer prefers certain types of commercials to be displayed with a higher priority than other types of commercials in the received viewer selections may be queued based on the indicated priority for the corresponding commercials.

Accordingly, it is determined whether an end of one or more video image sequences is detected (block 445). If not, additional viewer selections may be received (block 430) and queued (block 440). However, when an end of one or more video image sequences is detected (block 445), the video advertising content is displayed after ends of ones of the sequences of video image in order that is based on the queuing and at the time(s) indicated by the selected viewer profile (block 450). For instance, some video advertising content may be displayed at the end of a current scene of a television program in the order designated by the corresponding queued viewer selections, some video advertising content may be displayed at the end of a subsequent scene, and the remaining video advertising content designated by the queued viewer selections may be displayed at the end of the television program. Also, it is determined whether a sufficient number of viewer selections have been received (block 460). For example, the provider of the television program, movie, and/or sporting event represented by the video image sequences may desire the viewer to view a predetermined number of television commercials prior to the end of the program, movie, and/or sporting event. As such, if it is determined that a sufficient number of viewer selections have been received, (block 460), operations continue and subsequent sequences of video images are displayed (block 490). However, if it is determined that the number of received viewer selections is less than a predetermined minimum (block 460), display of subsequent sequences of video images is at least temporarily impeded or prevented (block 470), and default video advertising content (for example, based on agreements with advertising content providers) is displayed (block 480) prior to the display of the remaining sequences of video images (block 490). Thus, video advertising content may be provided in a manner that is relatively unobtrusive to the viewer, while maintaining the overall amount and/or duration of video advertising content presented during a movie, television program, and/or televised sporting event.

The flowcharts of FIGS. 3 and 4 illustrate the architecture, functionality, and operations of embodiments of hardware and/or software in electronic devices configured to provide unobtrusive video advertising content according to some embodiments of the present invention. In this regard, each block represents a module, segment, or portion of code, which comprises one or more executable instructions for implementing the specified logical-function(s). It should also be noted that in other implementations, the function(s) noted in the blocks may occur out of the order noted in FIGS. 3 and 4. For example, two blocks shown in succession may, in fact, be executed substantially concurrently or the blocks may sometimes be executed in the reverse order, depending on the functionality involved.

Accordingly, some embodiments of the present invention may allow presentation of video advertising content to a viewer in a less obtrusive manner by alerting the viewer of available video advertising content in a discreet manner, and displaying the video advertising content based on viewer selections of associated on-screen objects after an end of one or more sequences of video images. In particular, the video advertising content may be displayed after predetermined programming breaks, such as the end of the scene of the television program, the end of the period of the sporting event, and/or the end of a movie. Thus from the perspective of the viewer, the video advertising content is presented in a manner such that viewing of the movie, television program, and/or sporting events is not interrupted.

In the drawings and specification, there have been disclosed exemplary embodiments of the invention. However, many variations and modifications can be made to these embodiments without substantially departing from the principles of the present invention. Accordingly, although specific terms are used, they are used in a generic and descriptive sense only and not for purposes of limitation, the scope of the invention being defined by the following claims.

That which is claimed:

1. A method of advertising, the method comprising:
   alerting a viewer of available video advertising content associated with an object displayed in a sequence of video images;
   receiving a viewer selection of the object responsive to alerting the viewer, the viewer selection indicating a desire to view the video advertising content associated with the object at a later time;
   detecting an end of the sequence of video images responsive to receiving the viewer selection of the object displayed in the sequence of video images; and
   displaying the video advertising content after the end of the sequence of video images responsive to receiving the viewer selection such that viewing of the sequence of video images is not interrupted.

2. The method of claim 1, further comprising:
   receiving viewer preference information indicating a desired time for viewing the video advertising content; and
   storing a viewer profile including the viewer preference information;
   wherein displaying the video advertising content comprises displaying the video advertising content after the end of the sequence of video images at the desired time indicated by the viewer profile.

3. The method of claim 2, wherein the viewer preference information further indicates a desired viewer alert method, and wherein alerting the viewer comprises:
   alerting the viewer of the available video advertising content using the desired method indicated by the viewer profile.

4. The method of claim 1, wherein alerting the viewer comprises:
   providing a tactile notification of an on-screen presence of the object associated with the available video advertising content.

5. The method of claim 1, wherein alerting the viewer comprises:
   displaying a textual and/or graphical notification of an on-screen presence of the object associated with the available video advertising content.

6. The method of claim 5, wherein displaying the textual and/or graphical notification comprises:
   displaying a textual and/or graphical icon on a display of a remote control associated with the display of the sequence of video images.

7. The method of claim 1, wherein alerting the viewer comprises:
   providing an audible notification of an on-screen presence of the object associated with the video advertising content.

8. The method of claim 1, wherein alerting the viewer comprises alerting the viewer of a plurality of available video advertising content associated with a plurality of objects displayed in a plurality of sequences of video images, wherein receiving the viewer selection comprises receiving a plurality of viewer selections corresponding to ones of the plurality of objects responsive to alerting the viewer, and further comprising:
   queuing the plurality of received viewer selections,
   wherein displaying the video advertising content comprises displaying ones of the plurality of video advertising content corresponding to the plurality of viewer selections in an order based on the queuing thereof after ends of ones of the plurality of sequences.

9. The method of claim 8, wherein queuing the plurality of viewer selections comprises:
   queuing the plurality of viewer selections based on an order of receipt thereof.

10. The method of claim 8, wherein queuing the plurality of viewer selections comprises:
    queuing the plurality of viewer selections in an order that is based on priority data associated with the corresponding ones of the plurality of video advertising content.

11. The method of claim 1, further comprising:
    at least temporarily impeding display of subsequent sequences of video images based on a number of received viewer selections.

12. The method of claim 1, wherein displaying the video advertising content comprises:
    determining a current location of the viewer; and
    displaying location-specific video advertising content based on the current location of the viewer.

13. The method of claim 1, wherein alerting the viewer comprises:
    determining a current location of the viewer; and
    alerting the viewer of the available video advertising content associated with the displayed object based on the current location of the viewer.

14. The method of claim 1, wherein alerting the viewer comprises:
    storing historical data comprising previously received viewer selections; and
    alerting the viewer of the available video advertising content associated with the displayed object based on the historical data.

15. An electronic device, comprising:
    a user interface configured to alert a viewer of available video advertising content associated with an object displayed in a sequence of video images and configured to receive a viewer selection of the object responsive to alerting the viewer, the viewer selection indicating a desire to view the video advertising content associated with the object at a later time; and
    an advertising module configured to detect an end of the sequence of video images responsive to receiving the viewer selection of the object displayed in the sequence of video images, and provide the video advertising content to a display after the end of the sequence of video images responsive to receiving the viewer selection via the user interface such that viewing of the sequence of video images is not interrupted.

16. The device of claim 15, wherein the user interface is further configured to receive viewer preference information indicating a desired time for viewing the video advertising content, and further comprising:
    a memory configured to store a viewer profile including the viewer preference information,
    wherein the advertising module is configured to provide the video advertising content to the display after the end of the sequence of video images at the desired time indicated by the viewer profile.

17. The device of claim 15, wherein the viewer preference information further indicates a preferred viewer alert method, and wherein the advertising module is configured to alert the viewer of the available video advertising content using the method indicated by the viewer profile.

18. The device of claim 15, wherein the advertising module is configured to at least temporarily impede display of further sequences of video images based on a number of viewer selections received via the user interface.

19. The device of claim 15, further comprising:
    a display configured to display the sequence of video images and the video advertising content after the end of the sequence of video images,
    wherein the device comprises a mobile terminal.

20. A computer program product for providing unobtrusive advertising content, the computer program product comprising:
    a non-transitory computer readable storage medium having computer readable program code embodied in said medium, said non-transitory computer readable program code comprising:
    computer readable program code configured to alert a viewer of available video advertising content associated with an object displayed in a sequence of video images;
    computer readable program code configured to receive a viewer selection of the object responsive to alerting the viewer, the viewer selection indicating a desire to view the video advertising content associated with the object at a later time;
    computer readable program code configured to detect an end of the sequence of video images responsive to receiving the viewer selection of the object displayed in the sequence of video images; and
    computer readable program code configured to display the video advertising content after the end of the sequence of video images responsive to receiving the viewer selection such that viewing of the sequence of video images is not interrupted.

* * * * *